United States Patent
Kraft et al.

(10) Patent No.: US 12,491,903 B2
(45) Date of Patent: Dec. 9, 2025

(54) AUTONOMOUS MACHINE NAVIGATION AND CHARGING

(71) Applicant: THE TORO COMPANY, Bloomington, MN (US)

(72) Inventors: Jason Thomas Kraft, Stillwater, MN (US); Adam Burghardt Stroud, St. Paul, MN (US)

(73) Assignee: THE TORO COMPANY, Bloomington, MN (US)

( * ) Notice: Subject to any disclaimer, the term of this patent is extended or adjusted under 35 U.S.C. 154(b) by 547 days.

(21) Appl. No.: 17/441,899

(22) PCT Filed: Apr. 17, 2020

(86) PCT No.: PCT/US2020/028710
§ 371 (c)(1),
(2) Date: Sep. 22, 2021

(87) PCT Pub. No.: WO2020/214925
PCT Pub. Date: Oct. 22, 2020

(65) Prior Publication Data
US 2022/0185317 A1   Jun. 16, 2022

Related U.S. Application Data

(60) Provisional application No. 62/870,439, filed on Jul. 3, 2019, provisional application No. 62/835,241, filed on Apr. 17, 2019.

(51) Int. Cl.
*B60W 60/00* (2020.01)
*G01C 21/34* (2006.01)
*G01C 21/36* (2006.01)

(52) U.S. Cl.
CPC ....... *B60W 60/001* (2020.02); *G01C 21/3469* (2013.01); *G01C 21/3605* (2013.01);
(Continued)

(58) Field of Classification Search
None
See application file for complete search history.

(56) References Cited

U.S. PATENT DOCUMENTS 10,274,954 B2   4/2019   Balutis et al.
10,685,299 B2   6/2020   Mejegård et al.
(Continued)

FOREIGN PATENT DOCUMENTS

CN   108760620 A   * 11/2018   ............. G01N 19/00
CN   109258060 B   *  4/2020   ........... A01D 34/008
(Continued)

OTHER PUBLICATIONS

Battery Internal Resistance, Energizer Technical Bulletin (Year: 2005).*
(Continued)

*Primary Examiner* — Vivek D Koppikar
*Assistant Examiner* — Kai NMN Wang
(74) *Attorney, Agent, or Firm* — Mueting Raasch Group

(57) ABSTRACT

An autonomous machine may be returned to a base station for charging based on remaining battery energy and an estimated travel energy threshold. The estimated travel energy threshold may be determined based on a direct and obstacle-free route from the machine's current position to the base station and an estimated energy consumed per unit distance, which may be updated. The remaining battery energy may be calculated using a battery management system.

21 Claims, 10 Drawing Sheets

(52) U.S. Cl.
CPC ... *B60W 2510/081* (2013.01); *B60W 2520/28* (2013.01); *B60W 2552/20* (2020.02)

(56) References Cited

U.S. PATENT DOCUMENTS

| | | | |
|---|---|---|---|
| 10,874,045 | B2 | 12/2020 | Balutis et al. |
| 11,171,497 | B2 | 11/2021 | Jiao et al. |
| 2012/0256752 | A1* | 10/2012 | Musser ............... H02J 7/04 340/636.2 |
| 2015/0333540 | A1* | 11/2015 | Niizuma ............. H02J 50/90 114/312 |
| 2016/0165795 | A1* | 6/2016 | Balutis ............. G05D 1/0044 701/25 |
| 2019/0357430 | A1 | 11/2019 | Kraft |
| 2020/0050208 | A1 | 2/2020 | Frick et al. |
| 2020/0356093 | A1 | 11/2020 | Shimamura et al. |
| 2020/0379469 | A1 | 12/2020 | Kameyama et al. |
| 2021/0076563 | A1* | 3/2021 | Andriolo ............ G05D 1/0088 |
| 2021/0223787 | A1 | 7/2021 | Pellisari |
| 2022/0053063 | A1 | 2/2022 | Nagayama |
| 2022/0272893 | A1 | 9/2022 | Kraft et al. |

FOREIGN PATENT DOCUMENTS

| | | | | |
|---|---|---|---|---|
| CN | 107548712 | B | * 5/2021 | |
| EP | 1632781 | A1 | * 3/2006 | ........... G01R 31/392 |
| WO | WO-2013155725 | A1 | * 10/2013 | ................ H02P 1/18 |
| WO | WO-2020025024 | A1 | * 2/2020 | ........... H02J 7/0063 |
| WO | 2020/214925 | | 10/2020 | |

OTHER PUBLICATIONS https://newarebattery.com/ocv-and-ccv/ (Year: 2013).*

Impact of road gradient on energy consumption of electric vehicles, Transportation Research Part D: Transport and Environment, vol. 54, 2017,pp. 74-81 (Year: 2017).*

International Search Report and Written Opinion for PCT/US2020/028710, mailed Aug. 24, 2020; 16 pages.

Written Opinion of the International Preliminary Examining Authority for PCT/US2020/028710, mailed Mar. 2, 2021; 7 pages.

International Preliminary Report on Patentability, Chapter II for PCT/US2020/028710, mailed May 12, 2021; 8 pages.

* cited by examiner

AUTONOMOUS MACHINE NAVIGATION AND CHARGING

The present application is a 35 U.S.C. § 371 U.S. National Stage of International Application No. PCT/US2020/028710, filed Apr. 17, 2020, which claims the benefit of U.S. Provisional Patent Application Nos.: 62/835,241, filed Apr. 17, 2019; and 62/870,439, filed Jul. 3, 2019, wherein all of the applications identified in this paragraph are incorporated herein by reference in their respective entireties.

Embodiments of the present disclosure relate to autonomous machines and, more particularly, to autonomous working machines such as robotic lawn mowers.

Existing autonomous machines utilize boundary wires to find their base station for charging, which may waste energy and battery life. For example, some autonomous machines randomly search for the boundary wire, then randomly select a direction to follow the boundary wire.

SUMMARY

The techniques of this disclosure generally relate to accurately predicting the battery energy needed, and identifying an efficient path, for an autonomous machine to return to a base station or any other destination. Such techniques may facilitate more efficient mowing of the work region with less downtime for charging.

In one aspect, the present disclosure provides an autonomous machine comprising a housing coupled to a maintenance implement, a battery coupled to the housing, a propulsion controller operably coupled to the battery and one or more motors, and a navigation system operably coupled to the battery and the propulsion controller. The navigation system is adapted to: direct the autonomous machine to operate in a work region; determine a remaining battery energy; determine a path from a current position of the autonomous machine in the work region to a destination position in the work region; and determine an estimated travel energy threshold based on the path representing an estimated amount of energy to be used to return to the destination position from the current position.

In another aspect, the present disclosure provides a method for autonomous machine navigation comprising: determining a remaining battery energy representing an amount of energy remaining in the battery of an autonomous machine; determining a path from a current position of the autonomous machine in a work region to a destination position in the work region; and determining an estimated travel energy threshold based on the path representing an estimated amount of energy to be used to return to the destination position from the current position.

In another aspect, the present disclosure provides an autonomous machine comprising a housing coupled to a maintenance implement, a battery coupled to the housing, a propulsion controller operably coupled to the battery and one or more motors, and a navigation system operably coupled to the battery and the propulsion controller. The navigation system comprises a battery management system adapted to determine a remaining battery energy.

The summary is not intended to describe each embodiment or every implementation of the present disclosure. A more complete understanding will become apparent and appreciated by reference to the following detailed description and claims taken in view of the accompanying figures of the drawing.

BRIEF DESCRIPTION OF THE DRAWINGS

Exemplary embodiments will be further described with reference to the drawings, wherein.

Figure 1A:
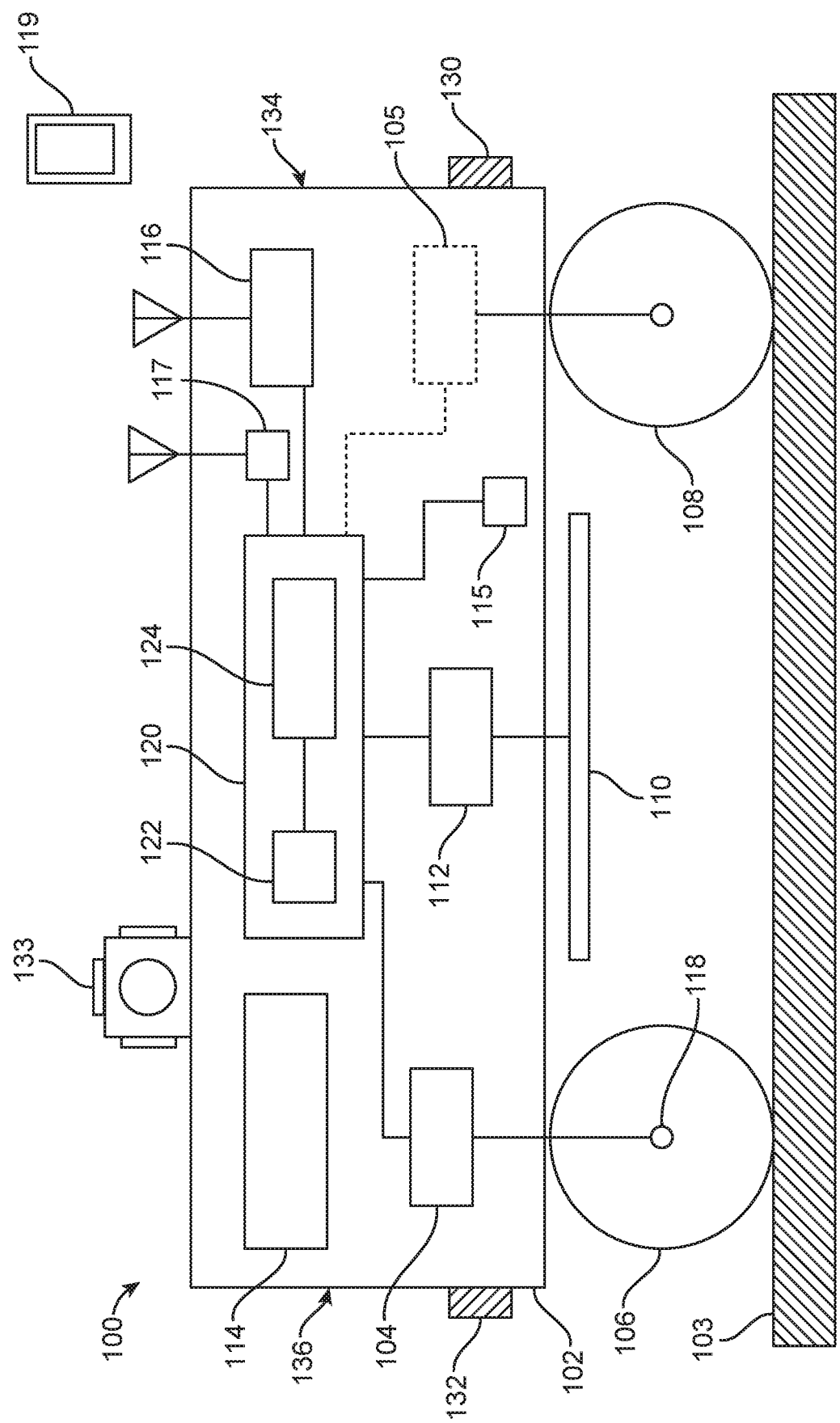
FIG. 1A is a diagrammatic side elevation view of an autonomous working machine (e.g., ground working machine such as a robotic lawn mower) incorporating a vision system in accordance with the present disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various illustrative embodiments described herein. The lack of illustration/description of such structure/components in a particular figure is, however, not to be interpreted as limiting the scope of the various embodiments in any way.

DETAILED DESCRIPTION

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." The term "and/or" (if used) means one or all of the listed elements or a combination of any two or more of the listed elements. "I.e." is used as an abbreviation for the Latin phrase id est and means "that is." "E.g.," is used as an abbreviation for the Latin phrase exempli gratia and means "for example." The term "or" is generally employed in its inclusive sense, for example, to mean "and/or" unless the context clearly dictates otherwise.

Embodiments of the present disclosure provide autonomous machines, methods, and systems to facilitate autonomous functioning of the machine within a work region. While different machines are certainly contemplated within the scope of this disclosure, an exemplary machine is described and illustrated herein as an autonomous lawn mower.

In some embodiments, the autonomous mower may learn and subsequently recognize a boundary of the work region using an onboard machine vision system and, optionally, other non-vision-based sensors. The vision system may utilize one or more cameras that together form part of a navigation system as described more fully in U.S. Provisional Patent Application No. 62/818,893, entitled AUTONOMOUS MACHINE NAVIGATION USING VISION SYSTEM, filed 15 Mar. 2019.

Also, in some embodiments, the autonomous mower may generate a terrain map of the work region using various onboard sensors. The mower may utilize any suitable technique, for example, as described in U.S. Provisional Patent Application No. 62/801,267, entitled AUTONOMOUS GROUNDS MAINTENANCE MACHINES WITH PATH PLANNING FOR TRAP AND OBSTACLE AVOIDANCE, filed 5 Feb. 2019.

Techniques of the present disclosure may allow the autonomous mower to more accurately predict the battery energy needed, and identify an efficient path, to return to a base station or any other destination. Such techniques may facilitate more efficient mowing of the work region with less downtime for charging.

The present disclosure provides autonomous machines that provide an intelligent navigation to return to a base station, or charging station, which may be implemented in a controller or be part of an overall navigation system, to provide the machine with additional functionality. The machine may be trained to determine boundaries for a work region, including any obstacles in the work region.

While described as an autonomous mower, such a configuration is illustrative only as systems and methods described herein also have application to other autonomous machines including, for example, commercial mowing products, other working machines or vehicles (e.g., debris blowers/vacuums, aerators, dethatchers, material spreaders, snow throwers, weeding machines for weed remediation mobile watering/treating vehicles), indoor working vehicles such as vacuums and floor scrubbers/cleaners (e.g., that may encounter obstacles), construction and utility vehicles (e.g., trenchers), observation vehicles, and load transportation (e.g., including people and things, such as people movers and hauling equipment). Furthermore, the autonomous machines described herein may employ various types of navigation, such as random, modified random, or specific path planning, to carry out their intended functionality.

It is noted that the terms "have," "include," "comprises," and variations thereof, do not have a limiting meaning, and are used in their open-ended sense to generally mean "including, but not limited to," where the terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or while the machine (e.g., mower 100) is in an operating configuration (e.g., while the machine 100 is positioned such that wheels 106 and 108 rest upon a generally horizontal ground surface 103 as shown in FIG. 1). These terms are used only to simplify the description, however, and not to limit the interpretation of any embodiment described. Further, the terms "determine" and "estimate" may be used interchangeably herein.

Figure 1B:
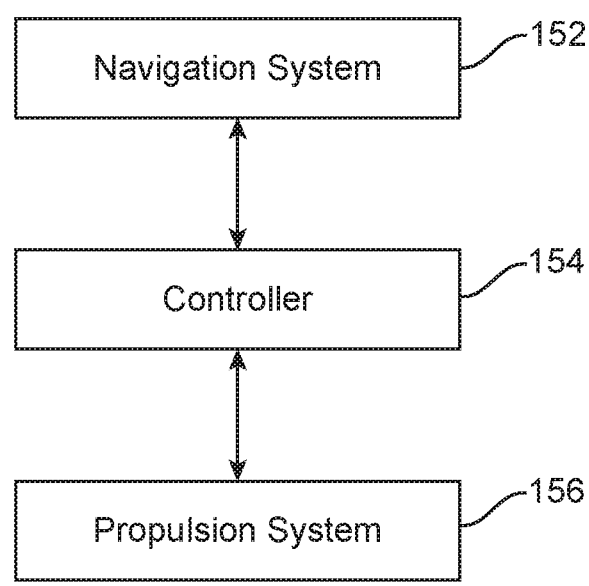
FIG. 1B is a diagram of one example of a method for use with the machine shown in FIG. 1A in accordance with the present disclosure.

While the construction of the actual working machine is not necessarily central to an understanding of embodiments of this disclosure, FIGS. 1A and 1B schematically illustrates an exemplary autonomous working machine configured as an autonomous lawn mower 100, which forms part of a lawn mowing system that may include other components such as a charging base (not shown). As shown in this view, the mower 100 may include a housing 102 (e.g., frame or chassis with a shroud) that carries and/or encloses various components of the mower as described below. The mower 100 may further include ground support members, such as wheels, rollers, or tracks. In the illustrated embodiment, the ground support members include one or more rear wheels 106 and one or more front wheels 108, that support the housing 102 upon a ground (grass) surface 103. As illustrated, the front wheels 108 are used to support a front-end portion 134 of the mower housing 102 and the rear wheels 106 are used to support a rear-end portion 136 of the mower housing.

One or both rear wheels 106 may be driven by a propulsion system (e.g., including one or more electric wheel motors 104) to propel the mower 100 over the ground surface 103. In some embodiments, the front wheels 108 may freely caster relative to the housing 102 (e.g., about vertical axes). In such a configuration, mower direction may be controlled via differential rotation of the two rear wheels 106 in a manner similar to a conventional zero-turn-radius (ZTR) riding mower. That is to say, the propulsion system may include a separate wheel motor 104 for each of a left and right rear wheel 106 so that speed and direction of each rear wheel may be independently controlled. In addition, or alternatively, the front wheels 108 could be actively steerable by the propulsion system (e.g., including one or more steer motors 105) to assist with control of mower 100 direction, and/or could be driven by the propulsion system (i.e., to provide a front-wheel or all-wheel drive mower).

An implement (e.g., a grass cutting element, such as a blade 110) may be coupled to a cutting motor 112 (e.g., implement motor) carried by the housing 102. When the motors 112 and 104 are energized, the mower 100 may be propelled over the ground surface 103 such that vegetation (e.g., grass) over which the mower passes is cut by the blade 110. While illustrated herein using only a single blade 110 and/or motor 112, mowers incorporating multiple blades, powered by single or multiple motors, are contemplated within the scope of this disclosure. Moreover, while described herein in the context of one or more conventional "blades," other cutting elements including, for example, disks, nylon string or line elements, knives, cutting reels, etc., are certainly possible without departing from the scope of this disclosure. Still further, embodiments combining various cutting elements, e.g., a rotary blade with an edge-mounted string trimmer, are also contemplated.

The mower 100 may further include a power source, which in one embodiment, is a battery 114 having a lithium-based chemistry (e.g., lithium-ion). Other embodiments may utilize batteries of other chemistries, or other power source technologies (e.g., solar power, fuel cell, internal combustion engines) altogether, without departing from the scope of this disclosure. It is further noted that, while shown as using independent blade and wheel motors, such a configuration is illustrative only as embodiments wherein blade and wheel power is provided by a single motor are also contemplated. The battery 114 may be coupled to and supported by the housing 102.

The mower 100 may further include one or more sensors to provide location data. For instance, some embodiments may include a global positioning system (GPS) receiver 116 (or other position sensor that may provide similar data) that is adapted to estimate a position of the mower 100 within a work region and provide such information to a controller 120 (described below). In other embodiments, one or more of the wheels 106, 108 may include encoders 118 that provide wheel rotation/speed information that may be used to estimate mower position (e.g., based upon an initial start position) within a given work region. The mower 100 may also include a sensor 115 adapted to detect a boundary wire, which could be used in addition to vision-based navigational techniques.

The mower 100 may optionally include one or more front obstacle detection sensors 130 and one or more rear obstacle detection sensors 132, as well as other sensors, such as side obstacle detection sensors (not shown). The obstacle detection sensors 130, 132 may be used to detect an obstacle in the path of the mower 100 when travelling in a forward or reverse direction, respectively (the mower 100 may be capable of mowing while moving in both forward and reverse directions). As illustrated, the sensors 130, 132 may be located at the front-end portion 134 or rear end-portion 136 of the mower 100, respectively. In addition to the sensors described, other sensors now known or later developed may also be incorporated into the mower 100.

The mower 100 may include one or more vision-based sensors to provide localization data, such as position, orientation, or velocity. The vision-based sensors may include one or more cameras 133 that capture or record image data for use with a vision system. The cameras 133 may be described as part of the vision system of the mower 100. Types of image data include, for example, training image data and/or operational image data. Operational image data may include various monitoring and security image data as further described below.

The one or more cameras may be capable of detecting visible light, non-visible light, or both. The one or more cameras may establish a total field of view of at least 30 degrees, at least 45 degrees, at least 60 degrees, at least 90 degrees, at least 120 degrees, at least 180 degrees, at least 270 degrees, or even at least 360 degrees, around the autonomous machine (e.g., mower 100). The field of view may be defined in a horizontal direction, a vertical direction, or both directions. For example, a total horizontal field of view may be 360 degrees, and a total vertical field of view may be 45 degrees. The field of view may capture image data above and below the height of the one or more cameras.

In some embodiments, the mower 100 includes four cameras 133. One camera 133 may be positioned in each of one or more directions including a forward direction, a reverse direction, a first side direction, and a second side direction (e.g., Cardinal directions relative to the mower 100). One or more camera directions may be positioned orthogonal to one or more other cameras 133 or positioned opposite to at least one other camera 133. The cameras 133 may also be offset from any of these directions (e.g., at a 45 degree or another non-right angle).

The mower 100 may include one or more illumination sources 140 that may be activated by the controller 120. The one or more illumination sources 140 may be incorporated in one or more of the cameras 133 or attached to the housing 102. The illumination source 140 may illuminate one or more areas around the mower 100. The illumination source 140 may be configured to project light above a ground level. This may prevent the one or more cameras of the cameras 133 from being blinded by reflections off the ground. Any suitable type of illumination source 140 may be used, such as a light-emitting diode.

The mower 100 may also include the controller 120 adapted to monitor and control various mower functions. The controller 120 may include a processor 122 that receives various inputs and executes one or more computer programs or applications stored in memory 124. The memory 124 may include computer-readable instructions or applications that, when executed, e.g., by the processor 122, cause the controller 120 to perform various calculations and/or issue commands. That is to say, the processor 122 and memory 124 may together define a computing apparatus operable to process input data and generate the desired output to one or more components/devices. For example, the processor 122 may receive various input data including positional data from a GPS receiver 116 and/or wheel encoders 118 and generate speed and steering angle commands to the drive wheel motor(s) 104 to cause the drive wheels 106 to rotate (at the same or different speeds and in the same or different directions). In other words, the controller 120 may control the steering angle and speed of the mower 100, as well as the speed and operation of the cutting blade 110.

Reference herein may be made to various parameters, data, or data structures, which may be handled in the controller 120, for example, by being processed by the processor 122 or stored in or retrieved from the memory 124. The controller 120 may use the processor 122 and memory 124 in different systems. For example, one or more processors 122 and memory 124 may be included in each different system. For example, in some embodiments, the controller 120 may form part of a vision system, which may include a processor 122 and memory 124. The controller 120 may also at least partially define a navigation system, which may also include a processor 122 and memory 124 the same or separate from the processor 122 and memory 124 of the vision system.

Each system may also be described as having its own controller 120. For example, the vision system may be described as including one controller 120 and the navigation system and security system may be described as having their own separate controllers 120, i.e., the mower 100 may be described as having multiple controllers 120. In general, as used herein, the term "controller" may be used to describe components of a system that receive inputs and provide commands to control various other components of the system.

In addition, the mower 100/controller 120 may be in operative communication (e.g., via a wireless radio 117) with a separate device, such as a remote computer 119. While not wishing to be bound to any specific configuration, the remote computer 119 could be configured as a desktop computer, cellular phone, tablet, wearable computer, or networked server. Conventional network hardware including gateways, routers, and wireless access points may be utilized to permit communication between the mower 100 and a local area network and/or a wide area network.

In view of the above, it will be readily apparent that the functionality of the controller 120 may be implemented in any manner known to one skilled in the art. For instance, the memory 124 may include any volatile, non-volatile, magnetic, optical, and/or electrical media, such as a random-access memory (RAM), read-only memory (ROM), non-volatile RAM (NVRAM), electrically-erasable programmable ROM (EEPROM), flash memory, and/or any other digital media. While shown as both being incorporated into the controller 120, the memory 124 and the processor 122 could be contained in separate modules.

The processor 122 may include any one or more of a microprocessor, a controller, a digital signal processor (DSP), an application specific integrated circuit (ASIC), a field-programmable gate array (FPGA), and/or equivalent discrete or integrated logic circuitry. In some embodiments, the processor 122 may include multiple components, such as any combination of one or more microprocessors, one or more controllers, one or more DSPs, one or more ASICs, and/or one or more FPGAs, as well as other discrete or integrated logic circuitry. The functions attributed to the controller 120 and/or processor 122 herein may be embodied as software, firmware, hardware, or any combination of these. Certain functionality of the controller 120 may also be performed in the "cloud" or other distributed computing systems operably connected to the processor 122.

In FIG. 1A, schematic connections are generally shown between the controller 120 and the battery 114, wheel motor(s) 104, blade motor 112, optional boundary wire sensor 115, wireless radio 117, and GPS receiver 116. This interconnection is illustrative only as the various subsystems of the mower 100 could be connected in most any manner, e.g., directly to one another, wirelessly, via a bus architecture (e.g., controller area network (CAN) bus), or any other connection configuration that permits data and/or power to pass between the various components of the mower. Although connections with some of the sensors 130, 132, 133 are not shown, these sensors and other components of the mower 100 may be connected in a similar manner. The wireless radio 117 may communicate over a cellular or other wide area network (e.g., over the internet), a local area network (e.g., IEEE 802.11 "Wi-Fi"), or a personal area or peer-to-peer network ("P2P," e.g., "Bluetooth") with the remote computer 119 (the remote computer may again be configured as, for example, a cellular phone, tablet, desktop, server, or wearable computer). In turn, the remote computer 119 may communicate with other devices over similar networks and, for example, may be used to connect the mower 100 to the internet.

In some embodiments, various functionality of the controller or controllers 120 described herein may be offloaded from the mower 100. For example, recorded image data may be transmitted to a remote server (e.g., in the cloud) using the wireless radio 117 and then processed or stored.

The mower 100 may utilize the exemplary vision and navigation systems to permit autonomous operation of the mower within a given work region(s). More information regarding exemplary operation and navigation of the mower 100 may be found, for example, in U.S. Provisional Patent Application No. 62/818,893.

Components of the vision and navigation systems (e.g., the cameras 133) may, in some embodiments, be utilized in low-light conditions. In addition to addressing navigation of dimly lit areas, the vision and navigations systems may be used to conserve power when mowing in low-light conditions (e.g., night).

In FIG. 1B, a schematic representation of various systems for navigating an autonomous machine (e.g., mower 100) to a destination is shown. Systems for navigating an autonomous machine may include navigation system 152, a controller 154 (e.g., the controller 120 of FIG. 1A), and a propulsion system 156. Although the controller 154 is illustrated separately from the other systems, the controller may be described as being part of any suitable system of the autonomous machine, such as the navigation system 152, the propulsion system 156, or both (e.g., a distributed processing system).

The navigation system 152 may be used to determine when and where the mower 100 should be directed during operation (e.g., online mode).

The propulsion system 156 may provide propulsion to an autonomous machine (e.g., mower 100) to traverse over a ground surface. The propulsion system 156 may include a propulsion controller operably coupled to a motor (e.g., electric wheel motors 104).

The controller 154 may be operably coupled to the navigation system 152 and the propulsion system 156 to control operation thereof. The controller 154 may be configured to receive data and signals from vision system 152 and propulsion system 156 and to provide commands to the navigation and propulsion systems.

During operation, the autonomous machine may decide to return to a base station for charging. Various techniques of this disclosure may be described as "intelligent return to home" or "intelligent return to base" techniques. The present disclosure provides techniques that include using a navigation system, work region mapping, and path planning to return the autonomous machine on a direct, obstacle-free route to the base station for charging. These techniques may optimize, or maximize, energy usage and time for mowing.

Figure 2:
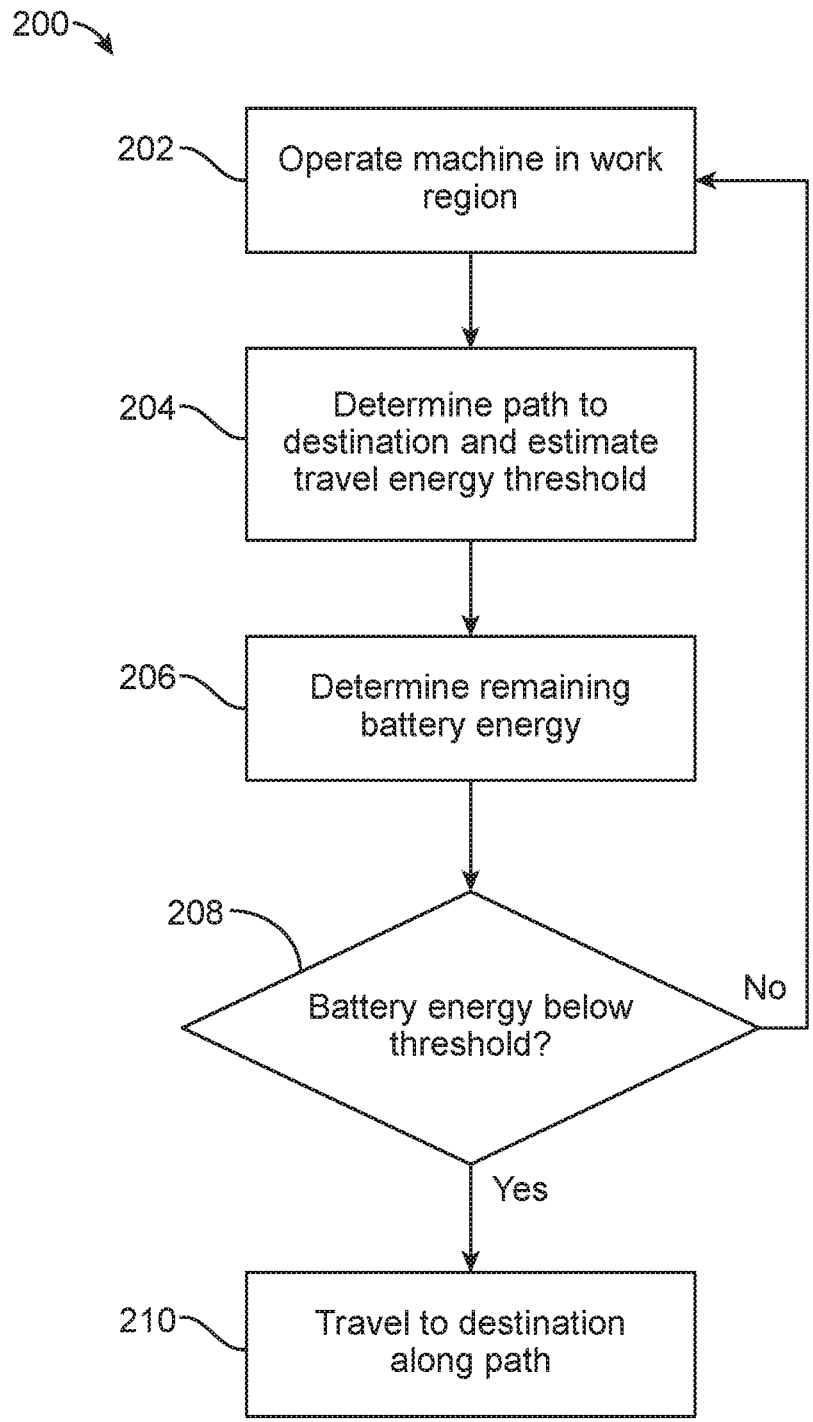
FIG. 2 is a flow diagram of one example of a navigation method for use with the machine shown in FIGS. 1A-B in accordance with the present disclosure.

FIG. 2 shows one example of a method 200 for navigating and charging an autonomous machine, such as mower 100. The method 200 may include operating the autonomous machine in a work region in process 202. Operation of the machine may be based on trained boundaries within the work region. Various types of boundaries may define a containment zone, an exclusion zone, or a transit path. An exclusion zone may be defined, for example, around an obstacle in the work region.

The method 200 may include determining a path to a destination and estimating a travel energy threshold required to travel to the destination in process 204. In some embodiments, the destination is a base station or docking station. The estimated travel energy threshold may be determined based on the estimated travel energy required to traverse the determined path. In general, the threshold is larger than the estimated travel energy to ensure the machine can reach the destination. In some embodiments, the threshold may be determined based on a sufficient safety factor or safety margin (e.g., an additional 5, 10, 20, or 25 percent).

The method 200 may also include determining the remaining battery energy in process 206. Any suitable technique may be used to determine the remaining battery energy known to one skilled in the art having the benefit of this disclosure. In some embodiments, the remaining battery energy may be determined using estimates based on operation conditions or measurements made periodically or in real-time.

In process 208, the method 200 may compare the remaining battery energy to the threshold. If the remaining battery energy is higher than or equal to the threshold, the method 200 may return to operating the machine in the work region in process 202, determining the path to destination and estimating the travel energy threshold in process 204, and determining the remaining battery energy in process 206.

The remaining battery energy and the estimated travel energy may change from position-to-position as the machine operates. In general, the remaining battery energy decreases during operation, and the estimated travel energy changes based on the distance of the path to the destination.

The path to the destination, the estimated travel energy threshold, and the remaining battery energy may be calculated one or multiple times during operation of the machine in the work region to facilitate the ability for the machine to reach the destination. In some embodiments, the path to the destination, the estimated travel energy threshold based on the estimated travel energy, and the remaining battery energy may be periodically or continuously updated in real-time in a manner sufficient to compare the remaining battery energy to the threshold before the remaining battery energy can drop below the estimated travel energy. In other words, the method 200 and machine may be configured to ensure that the remaining battery energy always exceeds the estimated travel energy.

If the remaining battery energy is lower than the threshold, the method 200 may include commanding the machine to travel to the destination along the determined path in process 210. In some embodiments, the path to the destination may be described as a direct, obstacle-free route to the base station. The machine may charge upon reaching the destination, or base station. When the machine is fully charged, the machine may continue to operate in the work region according to schedule.

By having an estimate of how much energy is required to drive, or travel, to the base station, and an estimate of remaining battery energy, the machine can continue to mow until it actually needs to recharge. Time spent traveling to and from the base station may be minimized.

The estimated travel energy and the related threshold may be determined based on the distance along the path and an estimated energy consumed per unit distance.

Figure 3:
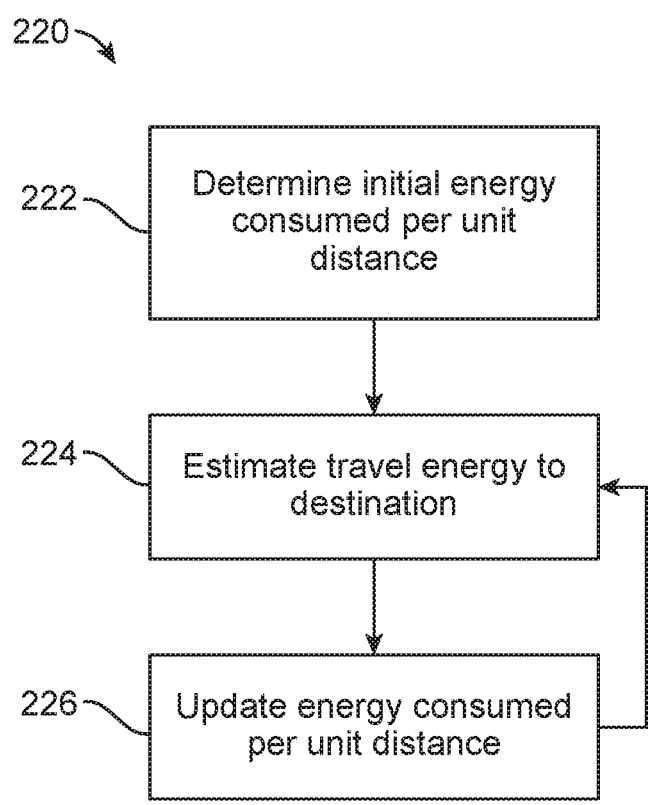
FIG. 3 is a flow diagram of one example of a method of determining travel energy for use with the method shown in FIG. 2 in accordance with the present disclosure.

FIG. 3 shows one example of a method 220 for determining an estimated travel energy, which may be used to derive the threshold, based on an estimated energy consumed per unit distance. The method 220 may include determining an initial energy consumed per unit distance in process 222.

Any suitable technique for determining energy consumed per unit distance may be used known to one skilled in the art having the benefit of this disclosure. In some embodiments, a energy consumed per unit distance, such as the initial energy consumed per unit distance, may be based on a maximum or "worst case" amount of energy consumed for a potentially large yard, tough terrain, wet grass, etc.

The energy consumed per unit distance may depend on various parameters, for example, whether the motor powering the implement is turned on or off and the speed of the mower. In some embodiments, a table of energy consumed per unit distance versus speed may be determined and stored as data. In some embodiments, such more than one table may be determined and stored as data to represent energy consumed per unit distance versus speed, for example, when the implement motor is ON and when the implement motor is OFF as shown in FIG. 4.

Figure 4:
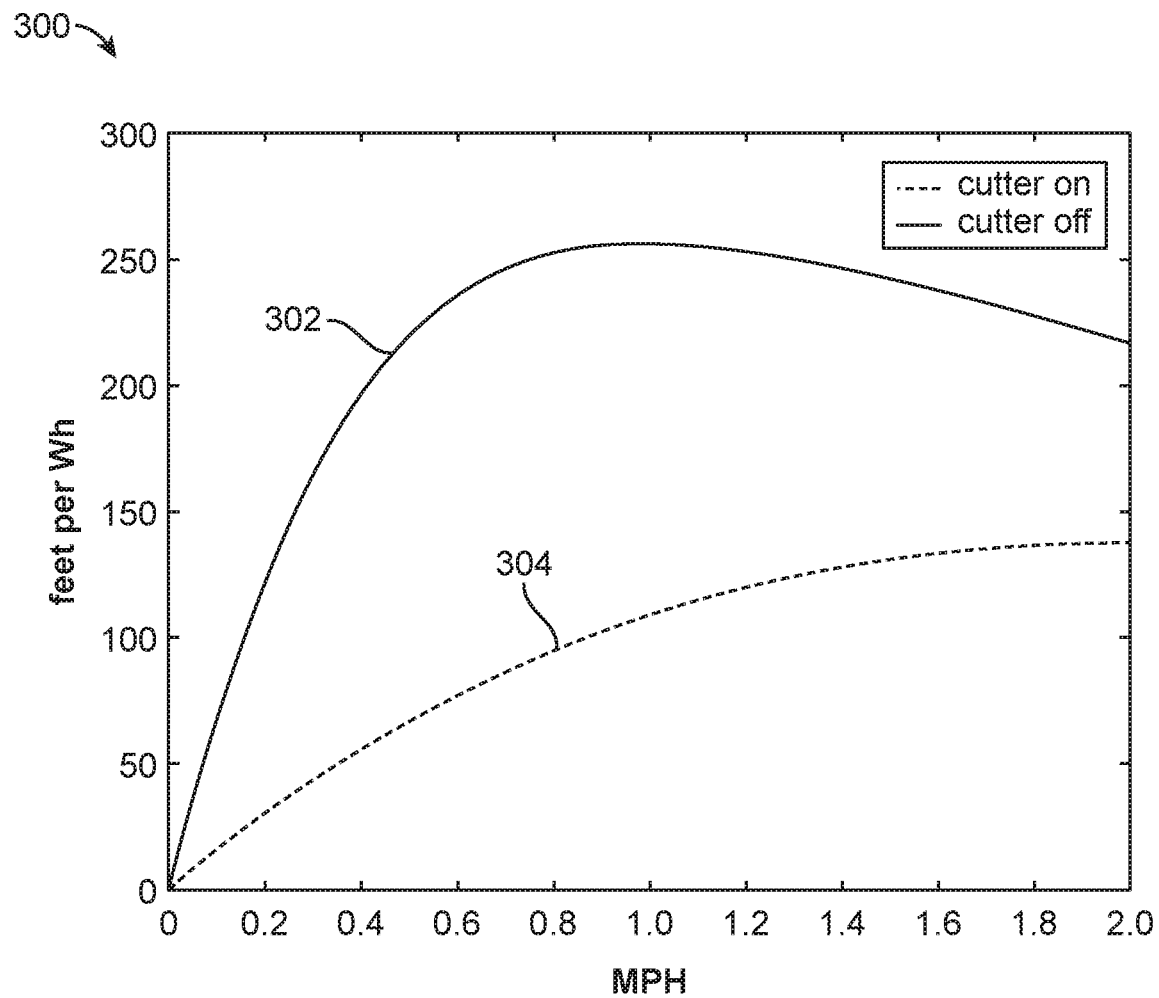
FIG. 4 is a plot of energy consumed per unit distance versus speed, which may be used to determine the travel energy shown in FIG. 3.

FIG. 4 shows one example of plots 302 and 304 that each represent a different table. As illustrated, the plot 302 represents energy consumed per unit distance (e.g., feet per watt-hour on the y-axis) versus speed (e.g., miles per hour on the x-axis) when the implement motor is OFF. The plot 304 represents energy consumed per unit distance versus speed plotted on the same axes when the implement motor is ON.

In some cases, the energy consumed per unit distance may increase with speed until a particular speed and then begin decreasing, for example, as shown around 1 miles per hour in plot 302. In other cases, the energy consumed per unit distance may increase with speed throughout the range of the mower, for example, as shown in plot 304 from 0-2 miles per hour.

The method 220 may estimate the travel energy to the destination based on the initial energy consumed per unit distance in process 224. The initial energy consumed per unit distance may continue to be used for the first few days of autonomous mowing. Over time, the machine can learn about terrain and turf load for the work region. For example, the machine may take measurements from one or more sensors to determine a measured energy consumed per unit distance. Such sensors may detect, for example, wheel load, battery levels, or other indications of energy usage by the mower while traveling over different parts of the work region.

The method 220 may include updating the energy consumed per unit distance based on the measurements in process 226. This updated information can be used to trace a path home (e.g., base station) on a regular basis and to compute a more accurate estimate of energy required to travel to the base station. In some embodiments, the path to the destination may be updated more frequently than the energy consumed per unit distance. In one example, the path to the destination may be updated from position-to-position du ring operation, whereas the energy consumed per unit distance may be updated on a daily or weekly basis. Other update frequencies are also contemplated.

Repeated updates to the estimate may account for changes in the work region over time. For example, as turf (e.g., tall or short grass) change over time, the energy per unit distance may also change over time. Frequent turf load calculations may be performed to provide more accurate estimated of the required energy to traverse a work region.

Repeated updates to the estimate may also account for changes in data collected about the work region over time. As more data is collected about the work region, which may be stored in a terrain map, better estimates of the impact of terrain (e.g., slopes) on the energy may be calculated, for example, to better predict a hill climb. In other words, the energy per unit distance may also be based on the terrain map.

Figure 5A:
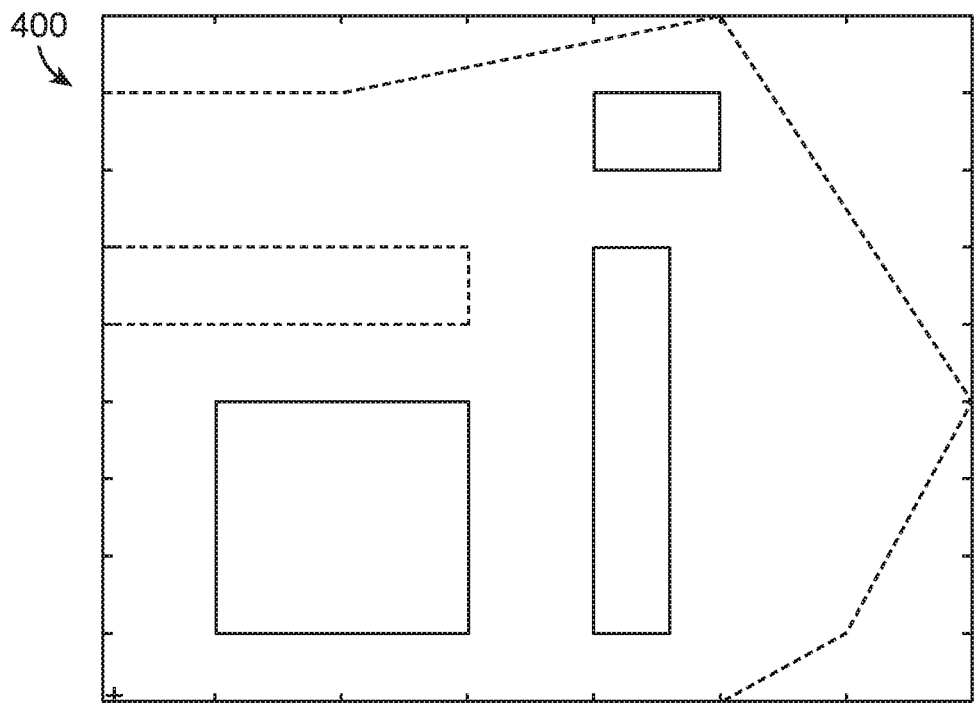
FIGS. 5A and 5B are plots of a work region in (A) an overhead view and (B) a perspective view in accordance with the present disclosure, which may be used with the method shown in FIG. 2.
Figure 5B:
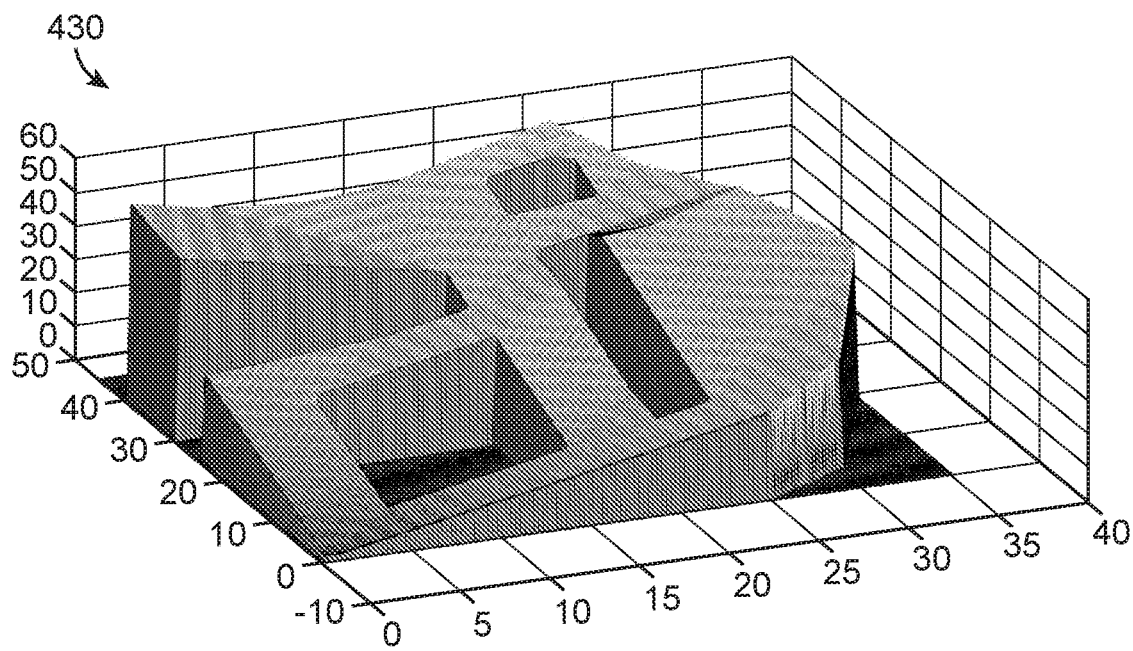

FIGS. 5A and 5B show an overhead two-dimensional map 400 (e.g., grid) of a work region including three exclusion zones and a perspective view of an estimated travel distance map 430 for the same work region. The maps may include a plurality of positions in the work region, and outside of the exclusion zones, in a two-dimensional plane (e.g., xy-plane).

The estimated travel distance map 430 provides an estimate of the obstacle-free distance (e.g., z-axis or vertical axis) required for the machine to travel to the base station, which is located at the lower left of the respective maps. The estimated travel distance map 430 may be described as a "wavefront" grid.

The estimated travel distance map 430 may be determined at least one time for the work region. For example, the estimated travel distance map 430 may be calculated once after all zones in the work region are trained. The distance to the base station may be determined by the value of the vertical axis (e.g., z-axis) at the position of the machine in the two-dimensional grid. To estimate the travel energy to return to the base station, the distance may be multiplied by the current estimated energy consumed per unit distance. Alternatively, any other technique to calculate travel energy to return to the base station known to one skilled in the art having the benefit of this disclosure may be used.

The estimated travel distance map 430 may be used to navigate the machine to the destination. The path to the destination may be determined, for example, by allowing the mower to travel "downhill" on the wavefront grid, which may provide a direct and obstacle-free route to the destination.

In some embodiments, the work region may be mapped with a terrain map. For example, the terrain map may be developed during a training mode of the machine, or during subsequent mowing operations. Regardless, the terrain map may contain information about the terrain of the work region, for example, elevation, grade, identified obstacles (e.g., permanent obstacles), identified stuck areas (e.g., areas the mower has gotten stuck whether due to grade or other traction conditions), or other information that may facilitate the ability of the machine to traverse the work region. The terrain map may be used to adjust the estimated travel energy to the destination and the related threshold, for example, by refining the estimated energy consumed per unit distance or adjusting the estimated travel distance represented on the map 430.

FIGS. 6-11 relate to a battery management system. The autonomous machine, such as mower 100 (FIG. 1A), may include a battery management system 500 to determine and manage the remaining battery energy in the machine. In some applications, the bulk of the work being done by the autonomous machine is by motors that output speed and torque based on voltage and current, otherwise known as power, which may be measured in watts (W). In order to provide an estimate of how much work motors can do with a battery, the energy remaining in the battery may be determined by the machine.

Energy may be measured watt-hours and may be based on both capacity and potential energy. Capacity may be measured in ampere-hours, and potential energy may be measured in voltage. Energy, more so than capacity or voltage alone, may provide a complete measure of the cumulative work that can be done by the machine. Tracking energy may facilitate more precise estimation of work that can be done compared to measuring capacity or voltage alone, especially when powering unpredictable loading patterns with unregulated voltages.

Figure 6:
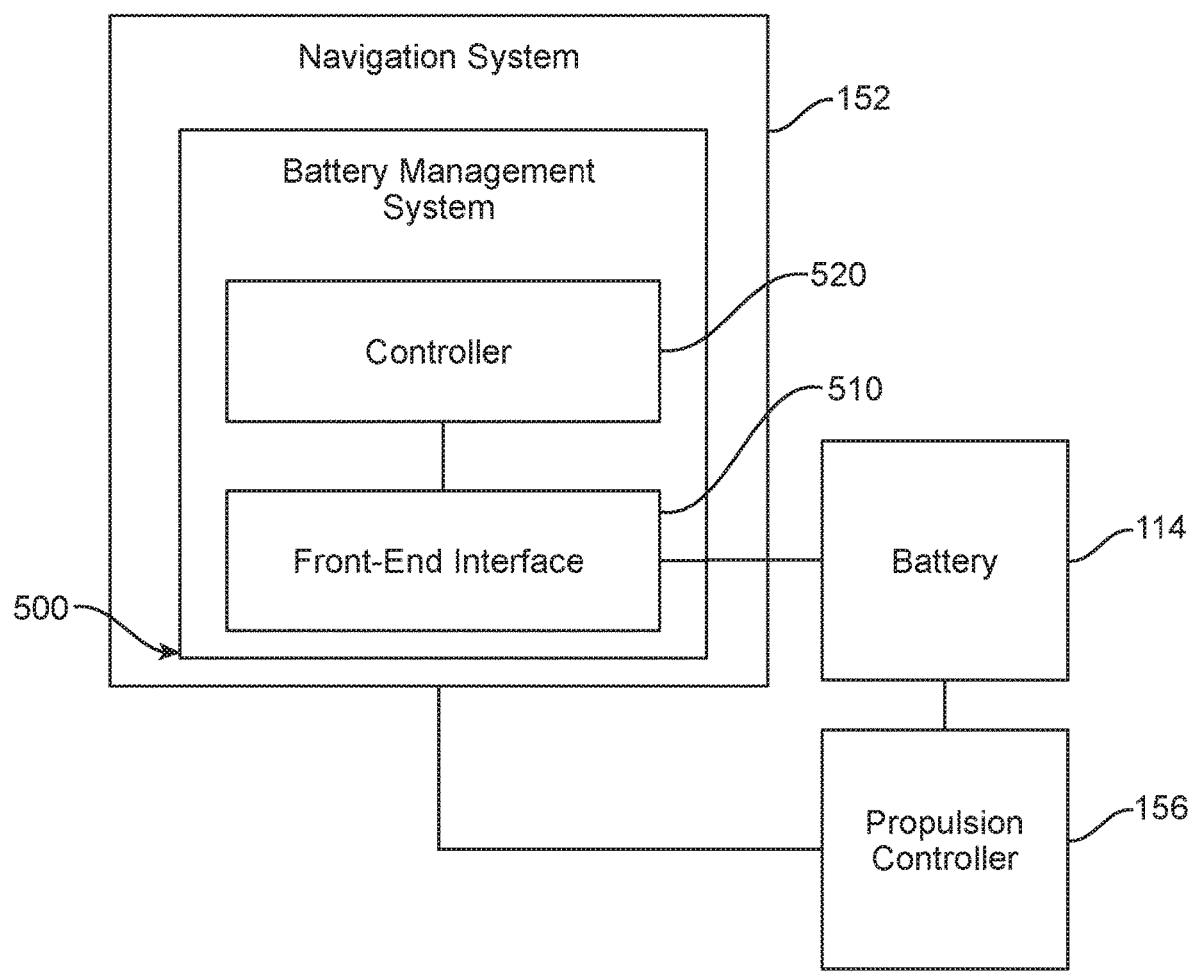
FIG. 6 is a diagram of one example of a battery management system of the navigation system shown in FIG. 1B.

As illustrated in FIG. 6, the battery management system 500 may be considered part of the navigation system 152, which may be coupled to a housing or chassis of the autonomous machine. The battery management system 500 may additionally, or alternatively, be considered part of another processing system operably coupled to the battery 114. The propulsion controller 156 may be operably coupled to the navigation system 152 and to the battery 114. Energy from the battery 114 may be used to provide energy to the propulsion controller 156 for motivating the autonomous machine.

The battery management system 500 may include any suitable components to carry out functionality to determine remaining battery energy. The battery management system 500 may include a front-end interface 510, which may include an analog-to-digital converter (ADC), to operably couple one or more nodes of the battery 114. The front-end interface 510 may also be described as an analog front end. The battery management system 500 may also include a controller 520, such as a microcontroller, or other processing circuitry. In general, the front-end interface 510 may provide measurements of various battery parameters, such as voltage, current, and temperature, to the controller 520 upon request by the controller. The controller 520 may determine useful information based on the measurements by the front-end interface 510.

The front-end interface 510 may include various circuitry to make measurements, such as voltage sensing circuitry, current sensing circuitry, and temperature sensing circuitry. One example of current sensing circuitry, or a current sensor, may include a shunt resistor, such as a 1 milliohm resistor.

The front-end interface 510 and the controller 520 may each include a chip operably coupled to one another and to a circuit board, which may be a printed circuit board. One non-limiting example of a chip suitable for the front-end interface 150 is a Texas Instruments BQ76920 Analog Front End. Any suitable communication protocol may be used by the front-end interface 510 and the controller 520 to send and receive information between them, such as $I^2C$ or another digital communication protocol.

Additional functionality may also be included in the battery management system 500, such as short-circuit protection. The front-end interface 510 may measure current at a very high rate, such as one measurement every 100 microseconds or less. A spike in measured current may trigger an open circuit to shutdown use of the battery 114, for example, by the controller 520 or front-end interface 510. Further, the controller 520 or the front-end interface 510 may be able to independently control the direction of current flow based on, for example, measured voltage, current, or temperature. In one example, the controller 520 or front-end interface 510 may detect a battery voltage that is too high (or exceeds a threshold) and may block the charging current to prevent further voltage increases while still allowing the battery 114 to discharge into the load, such as propulsion controller 156. This may be implemented, for example, by controlling banks of bidirectional power MOSFET transistors.

Figure 7:
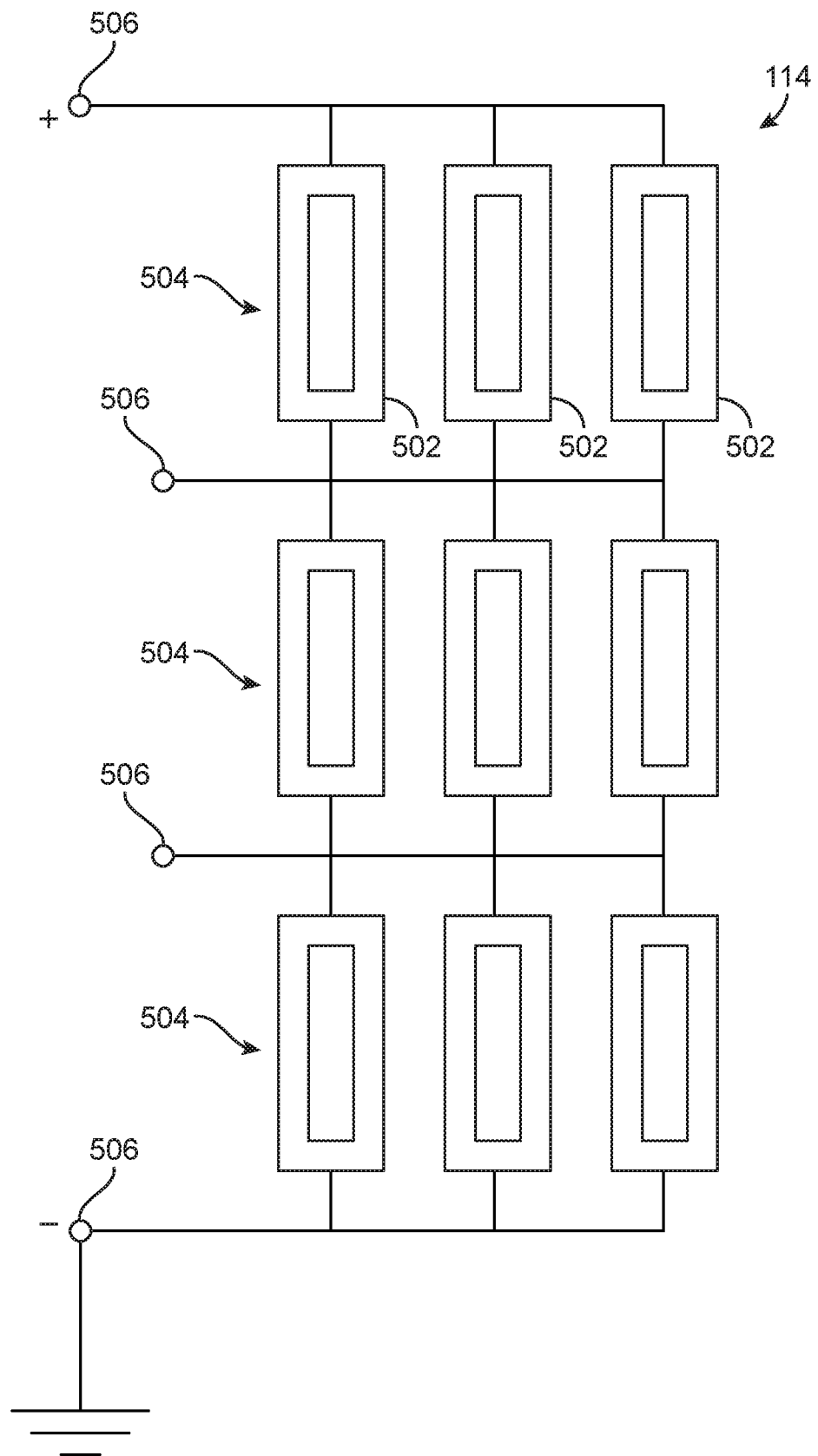
FIG. 7 is a diagram of one example of a battery cell configuration for the battery shown in FIG. 6.

As can be seen in FIG. 7, the battery 114 may include, or be formed of, one or more battery cells 502. Multiple battery cells 502, or a plurality of battery cells, may be arranged into a series, parallel, or series-parallel configuration. As illustrated, the battery 114 is formed in a series-parallel configuration including three series cells 504 electrically coupled in series with each series cell 504 including three battery cells 502 electrically coupled in parallel. Three series cells 504 electrically coupled in series may be described as a 3S configuration. Any suitable number of series cells 504 may be included, such as 2, 3, 4, 5, or 6. In one example, a battery having lithium-ion battery cells, each having a nominal voltage equal to 3.6 V, in a 5S configuration may have a nominal voltage equal to 18 V. Each series cell 504 may include any suitable number of battery cells 502 in parallel, such as 1, 2, 3, 4, or 5.

The battery 114 may be operably coupled to a battery management system, such as battery management system 500 (FIG. 6), in any suitable manner. One or more nodes 506, such as the cathode and the anode, of the battery 114 may be operably coupled to the battery management system, which may allow the battery management system to measure certain parameters, such as the current and voltage drop of the battery 114. One or more nodes 506 between one or more series cells 504 may be operably coupled to the battery management system, which may allow the battery management system to measure certain parameters, such as the voltage drop of each series cell 504.

Various characteristics of the battery 114 may change over time, such as the internal resistance or impedance of the battery. The age of the battery 114 may increase with each charge and discharge cycle. As the battery age increases, the impedance of the battery 114 may increase. The impedance of the battery 114 may be estimated, for example, based on battery age.

The change in impedance versus battery age may be predetermined, for example, in a lab setting. The measurements may be used to determine the change in impedance versus battery age for similar batteries. In one example of measuring the change in impedance versus battery age, the impedance of a battery may be measured after the battery is assembled. The battery may be cycled until the battery can no longer hold a charge, for example, using 1500 to 2000 cycles. A battery may be described as no longer holding a charge when the battery cannot provide power long enough to meet predetermined minimum runtime requirements of an application, for example, enough power to mow for at least a minimum amount of time, such as 15, 30, or 45 minutes.

The impedance of the battery may be measured after no longer being able to hold a charge. A line fitting algorithm may be applied to the impedance change versus battery age measured in cycles, such as a linear line-fitting algorithm. A slope of the line may be determined, which may be used to estimate the impedance of similar batteries as they age. In general, the impedance of the battery increases with age or each cycle.

The change in the impedance of the battery versus battery age may depend on battery cell chemistry and the battery cell configuration of the battery. The battery cell configuration may represent the series-parallel configuration of cells, as well as the impedance of the circuit board operably coupled to the battery cells. A slope may be determined for similar batteries, such as for each unique combination of battery cell chemistry and the battery cell configuration. The slope may be stored as data and associated with a battery chemistry identified and a battery cell configuration in a memory of the battery management system. The slope may be retrieved for use in determining the remaining battery energy.

In operation, the battery management system 500 may calculate a battery impedance based on an initial battery impedance and an impedance versus cycle slope. In one example, the battery management system 500 may measure the initial impedance of a newly assembled battery 114 before the battery enters into service, which may have a battery age of zero or close to zero. After the battery 114 is put into service and begins charging and discharging, the predetermined slope, which may be described as an impedance versus cycle slope, for the particular battery chemistry and battery cell configuration may be retrieved from memory and applied to the measured initial impedance to provide an estimate of the battery impedance based on the battery age. In another example, the impedance of the battery 114 may be measured or estimated based on a voltage drop and a known load.

As used herein, the term "cycle" refers to one complete charge and one complete discharge of the battery 114 in any order. The number of cycles of the battery may be stored as data in memory and retrieved by the battery management system to determine an estimate of the impedance. The number of cycles may be determined based on partial or whole charges and discharges. In one example, if a 12 amp-hour battery is discharged from full to half capacity (6 amp-hours) and subsequently charged from half capacity to full capacity, the battery management system may increment the number of cycles by one-half of a full cycle. In another example, a 12 amp-hour battery that discharges from full to 0 amp-hours and subsequently charges back to 12 amp-hours may result in the battery management system incrementing the number of cycles by one full cycle. Any suitable increment may be used to track the cycles.

Figure 8:
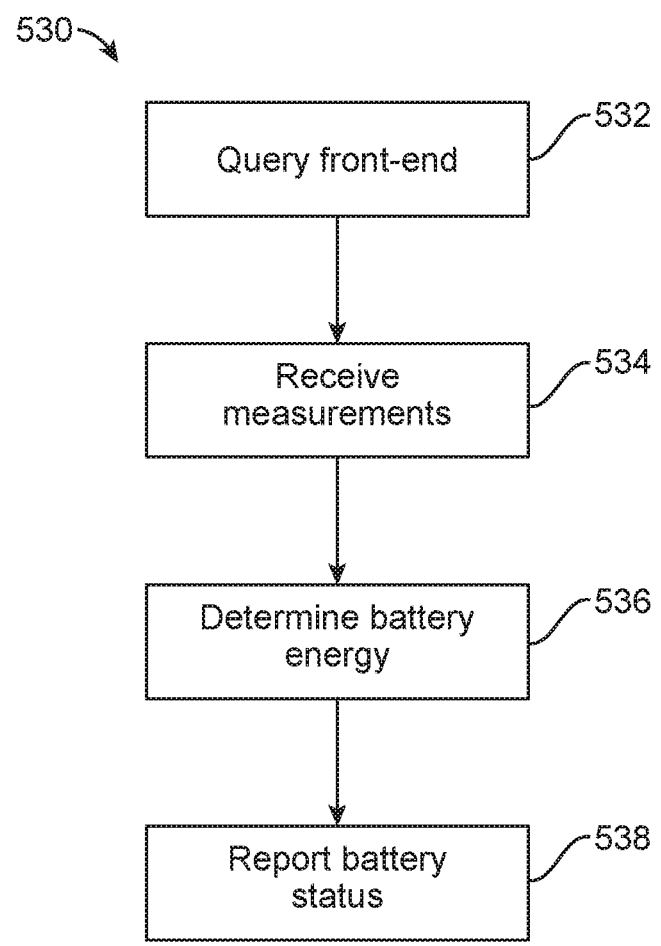
FIG. 8 is a flow diagram of one example of a method for use with the battery management system shown in FIG. 6.

FIG. 8 shows one example of a method 530 for operating a controller, such as the controller 520, to monitor the status of a battery. The method 530 may include querying the front-end interface in process 532. The controller may query the front-end interface periodically. For example, the controller may query the front-end every 250 milliseconds, or once every quartersecond. In response, the front-end interface may provide some or all measurements about the battery to the controller.

Measurements from the front-end interface may be received in process 534. Various examples of measurements that may be received include voltage, current, and temperature.

Remaining battery energy may be determined in process 536 based on the received measurements. Any suitable technique may be used to determine the remaining battery energy including those described with respect to FIGS. 9-11.

Battery status may be reported in process 538, which may include the remaining battery energy or other determinations based on the received measurements. The battery status may be reported to any suitable system, such as other parts of the navigation system or to a user interface. Non-limiting examples of a battery status report may include remaining energy, state of charge, cut-off warning flags, minimum and maximum cell voltages, and maximum cell temperature. Remaining energy may be provided in watt-hours or milliwatt-hours. State of charge may be provided in amp-hours or milliamp-hours. Cut-off warnings flags may serve to warn of an impending loss of battery power as a result of, but not limited to, low remaining energy, voltage limits, current limits, or temperature limits.

The navigation system may provide at least one of an estimated travel energy threshold, a remaining battery energy, or a battery charging rate to, for example, a scheduler, determine a start time of a next mowing session. The battery management system of the navigation system may determine a battery charging rate based on at least one of a start time of the next mowing session, an estimated travel energy threshold, or a remaining battery energy.

Any suitable technique to take measurements and to determine the battery status may be used. In one example, the front-end interface may measure a current or voltage as an average over a time period. The voltage may be averaged over 50 milliseconds, and the current may be averaged over 250 milliseconds. The controller may initiate a query every 250 milliseconds to receive the measurements. Capacity may be determined using a unit, or dimensional, conversion based on the received current measurement. The current measurement may be received in milliamp-quarterseconds, which may be converted to milliamp-seconds, to milliamp-hours, and to ampere-hours, which may be indicative of the change in battery capacity. Then, the change in battery capacity may be converted to watt-hours using a voltage determination. The remaining battery energy determination, in watt-hours, may be updated every 1 second using an average of four battery capacity determinations per quartersecond and the voltage determination. The voltage determination may be based on measuring the voltage of each series cell.

Figure 9:
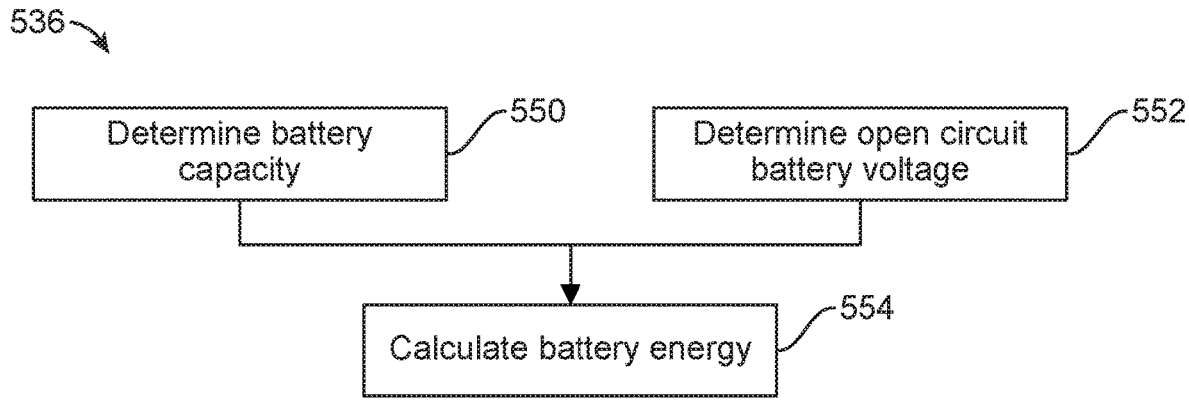
FIG. 9 is a flow diagram of one example of a method for determining battery energy in the method shown in FIG. 8.

FIG. 9 shows one example of a method 536 for determining battery energy. Battery capacity may be determined in process 550. Open circuit battery voltage may be determined in process 552. Battery energy may be calculated in process 554, for example, based on the battery capacity and the open circuit battery voltage as determined. The battery energy may be calculated by multiplying the battery capacity by the open circuit battery voltage.

Figure 10:
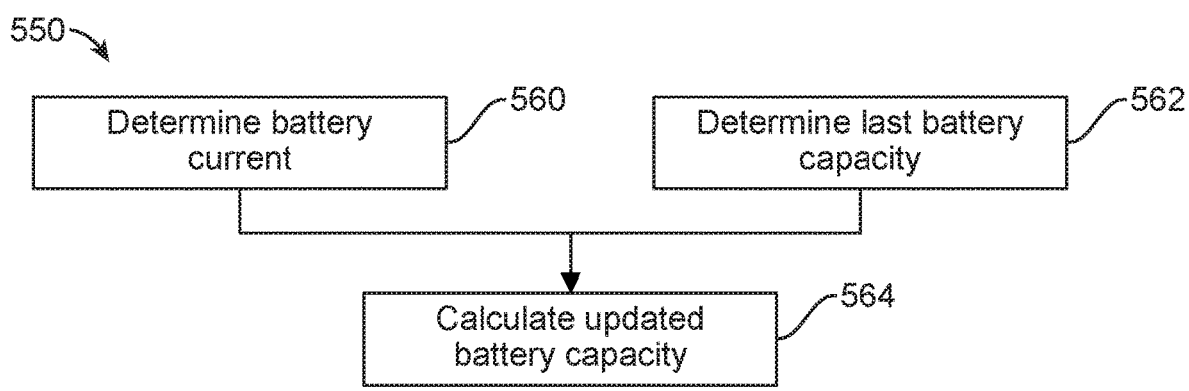
FIG. 10 is a flow diagram of one example of a method for determining battery capacity in the method shown in FIG. 9.

FIG. 10 shows one example of a method 550 for determining battery capacity. Battery current may be determined in process 560. The last battery capacity may be determined in process 562. Updated battery capacity may be calculated in process 564, for example, based on the battery current and the current capacity.

The battery current may be determined in process 560 over any suitable time period. A change in battery capacity may be determined based on the battery current and a particular time period, such as 0.1, 0.25, 0.5, or 1 second. For example, the particular time period may be 0.25 seconds, or one quartersecond, which may represent an average of four measurements by a front-end interface. The battery current may be integrated over the particular time period to calculate the change in battery capacity.

The last battery capacity may be determined in process 562 using a previously determined battery capacity. For example, each determination of battery capacity may be stored as data and retrieved to calculate an updated battery capacity.

In general, the method 550 may facilitate determining relative changes in battery capacity based on current measurements. The battery capacity may be calibrated to an absolute, or non-relative, value using any suitable technique. In one example, the battery management system tracks changes in capacity from a known capacity state, such as full discharge. A battery may be fully discharged, which may correspond to a low voltage threshold. The battery management system may measure current from a zero, or no, capacity state to track capacity.

In some cases, the battery management system may measure current from a full charge state to track capacity. The voltage of the battery at full charge may change with battery age.

Battery age may also affect the full charge capacity. In other words, the full charge capacity may change with battery age. An updated full charge capacity may be determined, for example, based on fully discharging the battery and fully charging the battery while measuring current to track capacity until the current tapers down to a termination current. In some cases, the updated full charge capacity may be compared to the last full charge capacity and updated in response to the updated full charge capacity being lower than the last full charge capacity, for example, to limit false readings.

In another example, the battery management system tracks changes in capacity from an estimated capacity state. For example, when a battery first "wakes up," an approximation of battery capacity may be made based on measuring the voltage of the battery or battery cells. The approximate battery capacity may be segmented into buckets or categories. For example, non-limiting examples of capacity buckets are 10, 20, 50, 80, and 100 percent capacity. The approximation may be conservative by, for example, rounding down.

The updated battery capacity may be updated in process 564 by adding the change in battery capacity, which may be determined based on measuring battery current, to the last battery capacity. The last battery capacity may be known or estimated.

Figure 11:
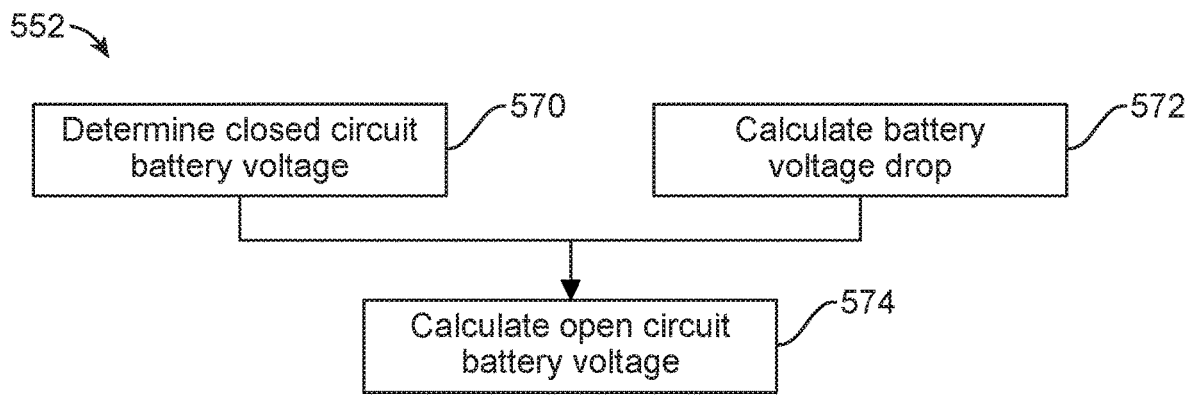
FIG. 11 is a flow diagram of one example of a method for determining open circuit battery voltage in the method shown in FIG. 9.

FIG. 11 shows one example of a method 552 for determining open circuit battery voltage. Closed circuit battery voltage may be determined in process 570. Battery voltage drop may be calculated in process 572. Open circuit battery voltage may be calculated in process 574, for example, based on closed circuit battery voltage and calculated battery voltage drop.

The closed circuit battery voltage may be determined in process 570 by measuring the voltage of the battery when the battery is placed under load. In particular, the load may be provided by an operating motor. As used herein in the context of the battery, a "load" refers to a component drawing a significant current, or at least a particular amount of current, from the battery, such as at least 10, 25, 50, or 100 milliamps detectable by current sensing circuitry. In some cases, the voltage of the battery may be measured based on voltage measurements of each series cell, which may facilitate monitoring the status or health of each series cell.

The battery voltage drop may be calculated in process 572 by measuring the battery current and calculating battery impedance. The battery impedance may be calculated based on battery age and an initial battery impedance. The initial battery impedance may be based on a measurement of battery impedance before the battery has been subjected to a substantial number of cycles, such as 1, 2, 5, or 10 cycles. Typically, the initial battery impedance is measured before the battery has completed even one cycle. The battery current may be measured, for example, with the front-end interface and current sensing circuitry. The battery voltage drop may be calculated by multiplying the battery current measurement with the battery impedance calculation.

The open circuit battery voltage may be determined in process 574 by adding the closed circuit battery voltage to the calculated battery voltage drop. The battery voltage drop may be determined based on the battery current and a calculated battery impedance.

ILLUSTRATIVE EMBODIMENTS

While the present disclosure is not so limited, an appreciation of various aspects of the disclosure will be gained through a discussion of the specific examples and illustrative embodiments provided below. Various modifications of the illustrative embodiments, as well as additional embodiments of the disclosure, will become apparent herein.

In embodiment A1, an autonomous machine comprises a housing coupled to a maintenance implement; a battery coupled to the housing; a propulsion controller operably coupled to the battery and one or more motors; and a navigation system operably coupled to the battery and the propulsion controller. The navigation system is adapted to: direct the autonomous machine to operate in a work region; determine a remaining battery energy; determine a path from a current position of the autonomous machine in the work region to a destination position in the work region; and determine an estimated travel energy threshold based on the path representing an estimated amount of energy to be used to return to the destination position from the current position.

In embodiment A2, an autonomous machine comprises the autonomous machine according to any A embodiment, further comprising a set of wheels configured to support the housing over a ground surface and the propulsion controller is adapted to control speed and rotational direction of the wheels independently using the one or more motors, thereby controlling both speed and direction of the housing over the ground surface.

In embodiment A3, an autonomous machine comprises the autonomous machine of any A embodiment, wherein the remaining battery energy is determined based on a battery capacity and an open circuit battery voltage.

In embodiment A4, an autonomous machine comprises the autonomous machine of embodiment A3, wherein the navigation system is adapted to determine the battery capacity based on a battery current over a particular time period and a last battery capacity.

In embodiment A5, an autonomous machine comprises the autonomous machine of embodiment A3-A4, wherein the navigation system is adapted to determine the battery capacity in response to a full discharge of the battery or an estimated battery capacity.

In embodiment A6, an autonomous machine comprises the autonomous machine of any embodiment A3-A5, wherein the navigation system is adapted to determine the open circuit battery voltage based on a closed circuit battery voltage and a calculated battery voltage drop.

In embodiment A7, an autonomous machine comprises the autonomous machine of embodiment A6, wherein the battery comprises a plurality of battery cells, wherein the navigation system is adapted to determine the closed circuit battery voltage based on a voltage of each series cell in the battery under load.

In embodiment A8, an autonomous machine comprises the autonomous machine of embodiment A6-A7, wherein the navigation system is adapted to determine the battery voltage drop based on a battery current and a calculated battery impedance.

In embodiment A9, an autonomous machine comprises the autonomous machine of embodiment A8, wherein the navigation system is adapted to calculate the battery impedance based on an initial battery impedance and battery age.

In embodiment A10, an autonomous machine comprises the autonomous machine of any A embodiment, wherein the navigation system is adapted to provide at least one of an estimated travel energy threshold, the remaining battery energy, or a battery charging rate to determine a start time of a next mowing session.

In embodiment A11, an autonomous machine comprises the autonomous machine of any A embodiment, wherein the navigation system is adapted to determine a battery charging rate based on at least one of a start time of the next mowing session, an estimated travel energy threshold, or the remaining battery energy.

In embodiment B1, a method for autonomous machine navigation comprises determining a remaining battery energy representing an amount of energy remaining in the battery of an autonomous machine; determining a path from a current position of the autonomous machine in a work region to a destination position in the work region; and determining an estimated travel energy threshold based on the path representing an estimated amount of energy to be used to return to the destination position from the current position.

In embodiment B2, a method comprises the method according to any B embodiment, further comprising: comparing the remaining battery energy to the estimated travel energy threshold; and navigating the autonomous machine along the path to the destination position in response to the remaining battery energy falling below the estimated travel energy threshold.

In embodiment B3, a method comprises the method according to any B embodiment, wherein determining the path is based on a minimum distance traveled compared to one or more other possible paths to reach the destination position.

In embodiment B4, a method comprises the method according to any B embodiment, wherein the path avoids obstacles in the work region.

In embodiment B5, a method comprises the method according to any B embodiment, further comprising generating an estimated travel distance map representing a distance for each of a plurality of positions in the work region and determining the path based on the estimated travel distance map.

In embodiment B6, a method comprises the method according to any B embodiment, further comprising determining the estimated travel energy threshold based on an energy consumed per unit distance.

In embodiment B7, a method comprises the method according to embodiment B6, further comprising determining the estimated energy consumed per unit distance based on a worst-case energy consumed per unit distance.

In embodiment B8, a method comprises the method according to any embodiment B6-B7, further comprising determining the energy consumed per unit distance based on a measured energy consumed per unit distance from operation of the autonomous machine in the work region.

In embodiment C1, an autonomous machine comprises a housing coupled to a maintenance implement; a battery coupled to the housing; a propulsion controller operably coupled to the battery and one or more motors; and a navigation system operably coupled to the battery and the propulsion controller, the navigation system comprising a battery management system adapted to determine a remaining battery energy.

In embodiment C2, an autonomous machine comprises the autonomous machine of any C embodiment, wherein the remaining battery energy is determined based on a battery capacity and an open circuit battery voltage.

In embodiment C3, an autonomous machine comprises the autonomous machine of embodiment C2, wherein the battery management system is adapted to determine the battery capacity based on a battery current over a particular time period and a last battery capacity.

In embodiment C4, an autonomous machine comprises the autonomous machine of embodiment C2-C3, wherein the battery management system is adapted to determine the battery capacity in response to a full discharge of the battery or an estimated battery capacity.

In embodiment C5, an autonomous machine comprises the autonomous machine of any embodiment C2-C4, wherein the battery management system is adapted to determine the open circuit battery voltage based on a closed circuit battery voltage and a calculated battery voltage drop.

In embodiment C6, an autonomous machine comprises the autonomous machine of embodiment C5, wherein the battery comprises a plurality of battery cells, wherein the battery management system is adapted to determine the closed circuit battery voltage based on a voltage of each series cell in the battery under load.

In embodiment C7, an autonomous machine comprises the autonomous machine of embodiment C5-C6, wherein the battery management system is adapted to determine the battery voltage drop based on a battery current and a calculated battery impedance.

In embodiment C8, an autonomous machine comprises the autonomous machine of embodiment C7, wherein the battery management system is adapted to calculate the battery impedance based on an initial battery impedance and battery age.

In embodiment C9, an autonomous machine comprises the autonomous machine of any C embodiment, wherein the navigation system is adapted to provide at least one of an estimated travel energy threshold, the remaining battery energy, or a battery charging rate to determine a start time of a next mowing session.

In embodiment C10, an autonomous machine comprises the autonomous machine of any C embodiment, wherein the battery management system is adapted to determine a battery charging rate based on at least one of a start time of the next mowing session, an estimated travel energy threshold, or the remaining battery energy.

In embodiment C11, an autonomous machine comprises the autonomous machine according to any C embodiment, further comprising a set of wheels configured to support the housing over a ground surface and the propulsion controller is adapted to control speed and rotational direction of the wheels independently using the one or more motors, thereby controlling both speed and direction of the housing over the ground surface.

In embodiment D1, an autonomous machine comprises the autonomous machine according to any B or C embodiment configured to perform the method according to any B embodiment.

Thus, various embodiments of autonomous machine navigation and charging are disclosed. Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety for all purposes, except to the extent any aspect directly contradicts this disclosure.

All scientific and technical terms used herein have meanings commonly used in the art unless otherwise specified. The definitions provided herein are to facilitate understanding of certain terms used frequently herein and are not meant to limit the scope of the present disclosure.

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content of this disclosure clearly dictates otherwise.

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out functionality.

As used herein, the term "configured to" may be used interchangeably with the terms "adapted to" or "structured to" unless the content of this disclosure clearly dictates otherwise.

The singular forms "a," "an," and "the" encompass embodiments having plural referents unless its context clearly dictates otherwise.

The phrases "at least one of," "comprises at least one of," and "one or more of" followed by a list refers to any one of the items in the list and any combination of two or more items in the list.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

What is claimed is:

1. An autonomous machine comprising:
a housing coupled to a maintenance implement;
a battery coupled to the housing;
a propulsion controller operably coupled to the battery and one or more motors; and
a navigation system operably coupled to the battery and the propulsion controller, the navigation system adapted to:
direct the autonomous machine to operate in a work region;
determine a remaining battery energy;
determine a path from a current position of the autonomous machine in the work region to a destination position in the work region; and
determine an estimated travel energy threshold based on an estimated energy consumed per unit distance;
generate a terrain map of the work region;
adjust the estimated energy consumed per unit distance based on the terrain map; and
adjust the estimated travel energy threshold to the destination based on the adjusted estimated energy consumed per unit distance.

2. The machine according to claim 1, further comprising a set of wheels configured to support the housing over a ground surface and the propulsion controller is adapted to control speed and rotational direction of the set of wheels independently using the one or more motors, thereby controlling both speed and direction of the housing over the ground surface.

3. The machine according to claim 1, wherein the energy consumed per unit distance is repeatedly updated based at least on a changing turf load over time learned by the autonomous machine.

4. A method for autonomous machine navigation comprising:
determining a remaining battery energy representing an amount of energy remaining in a battery of an autonomous machine;
determining a path from a current position of the autonomous machine in a work region to a destination position in the work region;
determining an estimated travel energy threshold based on the path representing an estimated amount of energy to be used to return to the destination position from the current position;

learning about a terrain map and turf load of the work region via one or more sensors of the autonomous machine; and adjusting the estimated travel energy threshold to the destination position based on at least one of the terrain map and the turf load.

5. The method according to claim 4, wherein the destination position comprises a charging station, the method further comprising:

comparing the remaining battery energy to the estimated travel energy threshold; and navigating the autonomous machine along the path to the destination position in response to the remaining battery energy falling below the estimated travel energy threshold.

6. The method according to claim 4, wherein determining the path is based on a minimum distance traveled compared to one or more other possible paths to reach the destination position.

7. The method according to claim 4, wherein the path avoids obstacles in the work region.

8. The method according to claim 4, further comprising generating an estimated travel distance map representing a distance for each of a plurality of positions in the work region and determining the path based on the estimated travel distance map.

9. The method according to claim 4, wherein the estimated travel energy threshold is updated based on data of the terrain map that describes slopes in the work region.

10. The method according to claim 4, further comprising:

determining the estimated travel energy threshold based on an estimated energy consumed per unit distance; and determining the estimated energy consumed per unit distance based on a worst-case energy consumed per unit distance.

11. The method according to claim 4, further comprising:

determining the estimated travel energy threshold based on an estimated energy consumed per unit distance;

determining the estimated energy consumed per unit distance based on a measured energy consumed per unit distance from operation of the autonomous machine in the work region; and repeatedly updating the estimated energy consumed per unit distance based at least on a changing turf load learned over time by the autonomous machine.

12. An autonomous machine comprising:

a housing coupled to a maintenance implement;

a battery coupled to the housing;

a propulsion controller operably coupled to the battery and one or more motors; and a navigation system operably coupled to the battery and the propulsion controller, the navigation system comprising a battery management system adapted to determine a remaining battery energy, the navigation system further operable to:

learn information about a work region via sensors of the autonomous machine, the information impacting energy consumption when traversing the work region and comprising at least one of grade, elevation, obstacles, and identified stuck areas;

determine a path from a current position of the autonomous machine in the work region to a destination in the work region;

determine an estimated travel energy threshold based on an estimated travel energy required to traverse the path; and adjust the estimated travel energy threshold to the destination based on the information about the work region along the path.

13. The machine according to claim 12, wherein the remaining battery energy is determined based on a battery capacity and an open circuit battery voltage.

14. The machine according to claim 13, wherein the battery management system is adapted to determine the battery capacity based on a battery current over a particular time period and a last battery capacity.

15. The machine according to claim 13, wherein the battery management system is adapted to determine the battery capacity in response to a full discharge of the battery or an estimated battery capacity.

16. The machine according to claim 13, wherein the battery management system is adapted to determine the open circuit battery voltage based on a closed circuit battery voltage and a calculated battery voltage drop.

17. The machine according to claim 16, wherein the battery comprises a plurality of battery cells, wherein the battery management system is adapted to determine the closed circuit battery voltage based on a voltage of each series cell in the battery under load.

18. The machine according to claim 16, wherein the battery management system is adapted to determine the calculated battery voltage drop based on a battery current and a calculated battery impedance.

19. The machine according to claim 18, wherein the battery management system is adapted to determine the calculated battery impedance based on an initial battery impedance and a battery age.

20. The machine according to claim 12, wherein the navigation system is adapted to provide at least one of the estimated travel energy threshold, the remaining battery energy, or a battery charging rate to determine a start time of a next mowing session.

21. The machine according to claim 12, wherein the battery management system is adapted to determine a battery charging rate based on at least one of a start time of a next mowing session, the estimated travel energy threshold, or the remaining battery energy.

* * * * *